(12) United States Patent
Li et al.

(10) Patent No.: US 7,928,859 B1
(45) Date of Patent: Apr. 19, 2011

(54) FULL ANGLE LASER ILLUMINATE INSTRUMENT CLUSTER

(75) Inventors: Kang Li, Windsor (CA); Michael Boyd, Saline, MI (US)

(73) Assignee: Yazaki North America, Inc., Canton, MI (US)

( * ) Notice: Subject to any disclaimer, the term of this patent is extended or adjusted under 35 U.S.C. 154(b) by 327 days.

(21) Appl. No.: 12/275,365

(22) Filed: Nov. 21, 2008

(51) Int. Cl.
*G08B 5/24* (2006.01)
*G09F 13/00* (2006.01)
*G01D 11/28* (2006.01)

(52) U.S. Cl. ......... 340/815.78; 340/815.54; 340/815.17; 340/815.68; 340/461; 340/525; 116/284; 116/286; 116/288; 116/309; 359/15

(58) Field of Classification Search ............. 340/815.78, 340/815.54
See application file for complete search history.

(56) References Cited

U.S. PATENT DOCUMENTS

| | | | |
|---|---|---|---|
| 2,285,374 A | 6/1942 | Dohsmann et al. | |
| 3,448,458 A | 6/1969 | Carlson et al. | |
| 3,781,092 A | 12/1973 | Sussman et al. | |
| 3,890,033 A | 6/1975 | McGee | |
| 4,484,179 A | 11/1984 | Kasday | |
| 4,553,842 A | 11/1985 | Griffin | |
| 4,761,715 A | 8/1988 | Brooks | |
| 4,762,990 A | 8/1988 | Caswell et al. | |
| 5,031,985 A | 7/1991 | Shinoda et al. | |
| 5,046,806 A | 9/1991 | Kidder et al. | |
| 5,090,791 A | 2/1992 | Kidder et al. | |
| 5,220,409 A | 6/1993 | Bures | |
| 5,294,940 A | 3/1994 | Wennagel et al. | |
| 5,353,735 A | 10/1994 | Arai et al. | |
| 5,424,533 A | 6/1995 | Schmutz | |
| 5,805,119 A | 9/1998 | Erskine et al. | |
| 5,825,495 A | 10/1998 | Huber | |
| 5,971,569 A | 10/1999 | Smith et al. | |
| 5,982,352 A | 11/1999 | Pryor | |
| 6,766,036 B1 | 7/2004 | Pryor | |
| 7,084,859 B1 | 8/2006 | Pryor | |
| 7,097,316 B2 | 8/2006 | Sumiyoshi | |
| 7,193,729 B1 | 3/2007 | Li | |
| 0,134,956 A1 | 6/2008 | Cook et al. | |
| 7,448,341 B2 * | 11/2008 | Cook et al. | 116/286 |
| 7,466,843 B2 | 12/2008 | Pryor | |
| 7,798,026 B2 * | 9/2010 | Takato et al. | 73/866.3 |
| 2008/0173233 A1 * | 7/2008 | Liu | 116/286 |

OTHER PUBLICATIONS

U.S. Appl. No. 12/435,096, filed May 4, 2009, Boyd et al.
U.S. Appl. No. 12/422,692, filed Apr. 13, 2009, Boyd et al.

* cited by examiner

*Primary Examiner* — Donnie L Crosland
(74) *Attorney, Agent, or Firm* — Harness, Dickey & Pierce, P.L.C.

(57) ABSTRACT

A display for measured quantities can include a dial plaque with at least one set of indicia spaced around the plaque to indicate the measured quantities. An optical device can be mounted on a shaft within a perimeter of the dial plaque at a location surrounded by the indicia. The optical device can redirect an incident light beam onto the area of the set of indicia. A motor can turn the shaft to rotate the optical device through three-hundred-sixty degrees about an axis of rotation centered on the shaft. Apparatus can be provided for sensing the shaft rotating angular position. A light source can project a light beam on the optical device through the axis of rotation, such that a virtual pointer is generated.

20 Claims, 4 Drawing Sheets

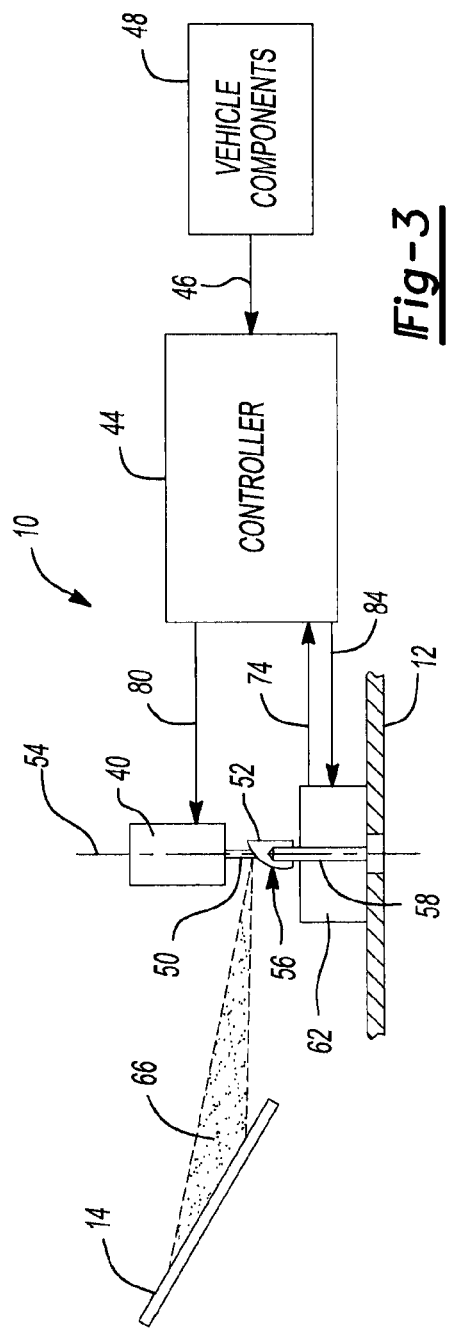
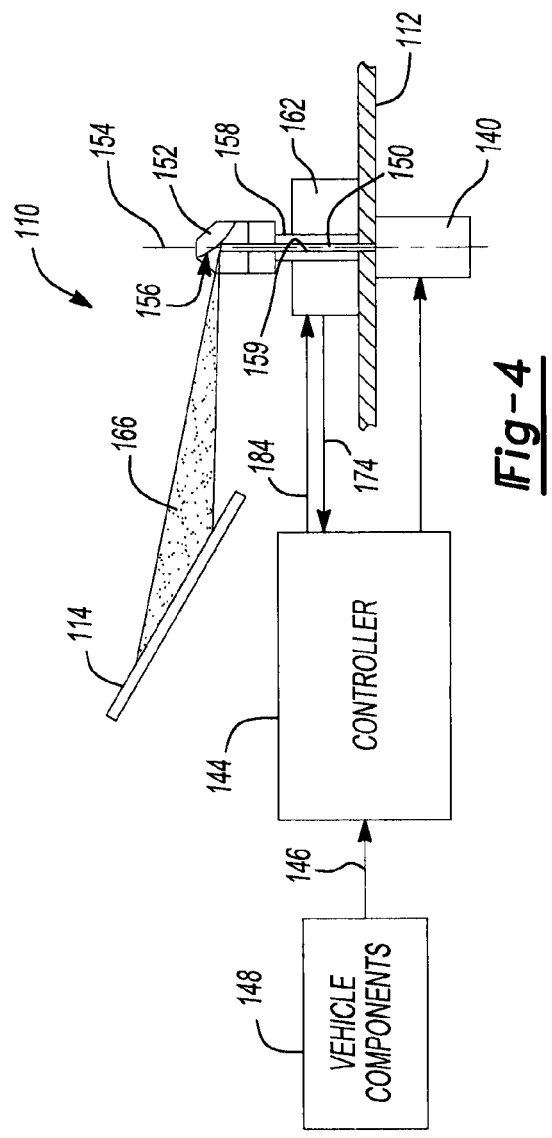

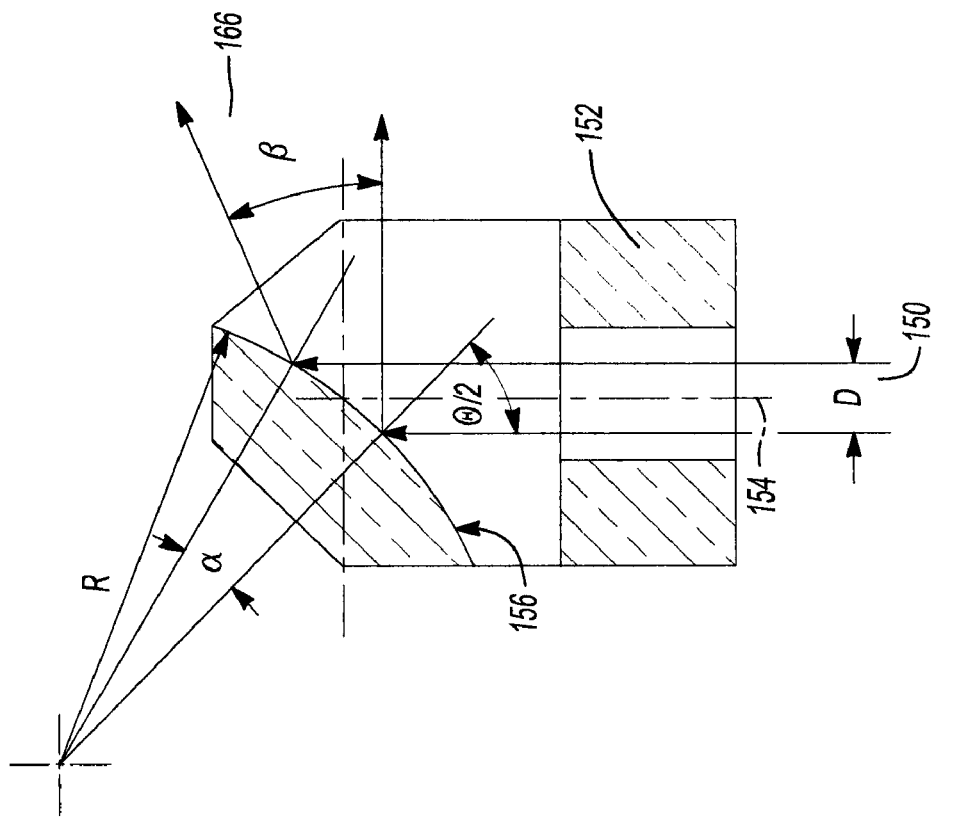
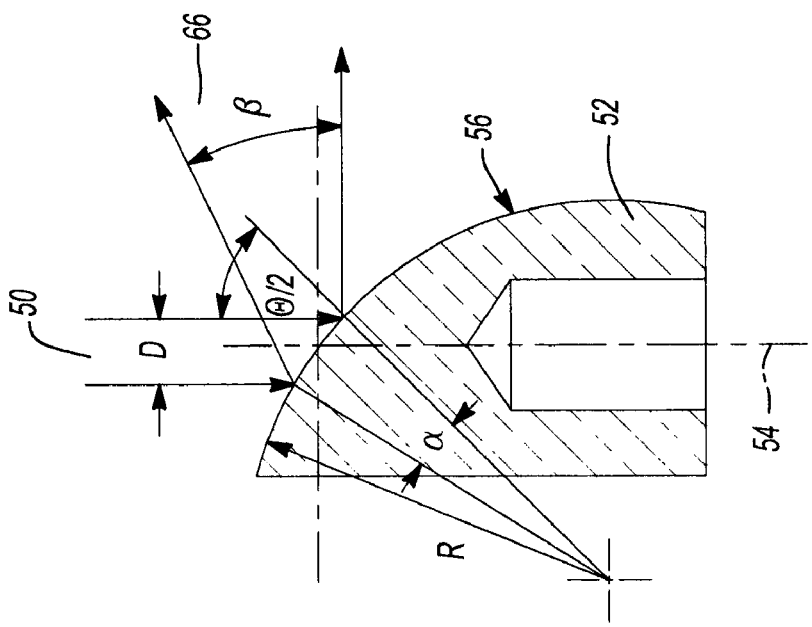

FULL ANGLE LASER ILLUMINATE INSTRUMENT CLUSTER

FIELD

The present disclosure relates to analog displays for measured quantities such as automotive speed, coolant temperature, fuel level and the like, and more particularly to an instrument cluster comprising a display field and having no conventional meter movements, pointers or other components susceptible to inertial effects.

BACKGROUND

This section provides background information related to the present disclosure which is not necessarily prior art.

Automotive instrument clusters typically comprise large discreet display areas for a speedometer and a tachometer, and a number of smaller displays for coolant temperature, oil pressure, oil temperature, fuel level and the like. Arranged within and around the cluster are other indicators showing low fluid level conditions, turn signal operation, emergency light blinkers and so forth. The analog displays within the display fields can be provided by means of devices having electromechanical movements for causing angular sweep of a needle across the display field. In many systems, low values of the measured quantity are typically displayed at the left side of the display field, high values at the right side of the display field, and intermediate values at incrementally spaced locations between the left and right sides.

It has become increasingly more difficult to attach cables, wires and other devices to the back side of the instrument cluster to provide all of the various desirable displays while retaining flexibility and accessibility. Moreover, all of the meter movements are difficult to calibrate and to maintain in calibration.

SUMMARY

This section provides a general summary of the disclosure, and is not a comprehensive disclosure of its full scope or all of its features.

A display for measured quantities can include a dial plaque with at least one set of indicia spaced around the plaque to indicate the measured quantities. An optical device, such as a mirror, can be mounted on a shaft within a perimeter of the dial plaque at a location surrounded by the indicia. The mirror can have a curved reflector surface with a predetermined radius. A motor can turn the shaft to rotate the mirror through three-hundred-sixty degrees about an axis of rotation centered on the shaft. Means can be provided for sensing the angular position of the shaft rotating. A light source can project a light beam on the reflector surface of the mirror through the mirror axis of rotation, such that a virtual pointer is generated.

According to other features, the optical device can enable the redirected secondary beam to be aimed at the indicia for a three-hundred-sixty degrees scan around the plaque as the optical device is rotated. A controller can receive signals representing the measured quantities. The controller can monitor the angular position of the shaft provided from signals from the sensing means and coordinate on/off of the light source based on the derived angular position.

According to additional features, the dial plaque can define multiple sets of indicia at corresponding display regions. Each set of indicia can correspond to a distinct measured quantity of the measured quantities. A unique illumination marker can be identified concurrently on each set of indicia by the light beam that is redirected by the optical device. According to one example, the motor can be located in a position intermediate of the optical device and the light source. In one configuration, the shaft can define a cannulation and the light source can project the light beam through the cannulation. According to one example, the optical device is a mirror. The mirror can define a body having an outer boundary wherein the reflector surface is formed within the outer boundary of the body. According to another example, the mirror can be located in a position intermediate of the motor and the light source. The light source can be a laser light source, a focused LED light source, or other collimated light sources.

According to additional features, the dial plaque can further comprise at least one telltale wherein the optical device redirects light from the light source at a location on the indicia and telltale to sequentially illuminate a location on the indicia and the telltale.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a cross-sectional view of the instrument cluster of FIG. 1;

FIG. 4 is an exemplary cross-sectional view of an instrument cluster according to another example of the present teachings and including a mirror having a reflector surface internal to its body and being coupled to a motor through a cannulated shaft;

FIG. 5 is a cross-sectional view of the mirror shown in FIGS. 1 and 3; and

FIG. 6 is a cross-sectional view of the mirror shown in FIG. 4.

Corresponding reference numerals indicate corresponding parts throughout the several views of the drawings.

DETAILED DESCRIPTION

Example embodiments will now be described more fully with reference to the accompanying drawings.

Figure 1:
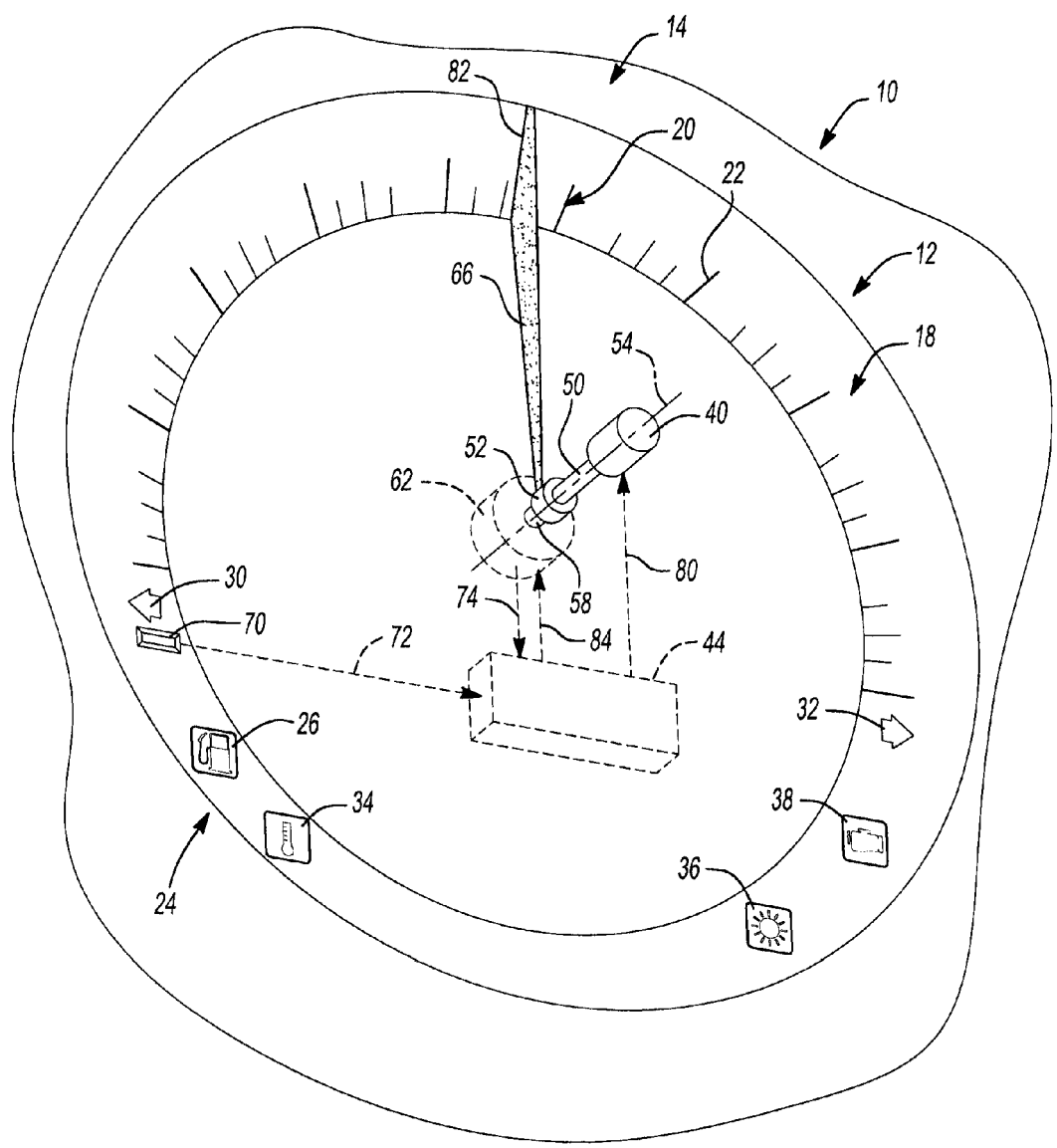
FIG. 1 is a front perspective view of an instrument cluster according to one example of the present teachings.

With initial reference to FIG. 1, an instrument cluster constructed in accordance with one example of the present teachings is shown and generally identified at reference numeral 10. The instrument cluster 10 can include a fascia 12 having a display field 14. The display field 14 can comprise a dial plaque 18. The dial plaque 18 in one exemplary embodiment may be taken to be representative of a speedometer display with low values at the left end and higher values toward the right-most or clockwise end. In this way, the dial plaque can comprise a set of indicia 20 arranged generally around the dial plaque 18 to indicate a measured quantity (such as a vehicle speed). Those skilled in the art will readily appreciate that while the dial plaque 18 has been representative of a speedometer to indicate vehicle speed, the dial plaque 18 can be configured to represent indicia indicative of any measured quantity such as, but not limited to, engine speed (a tachometer), a coolant temperature, a fuel level, an oil pressure, a cabin temperature, and outside temperature, time (a clock) and the like.

It is appreciated that the cluster 10 can be arranged in any vehicle, such as an automobile, an aircraft, a boat, or for various parameters in a power plant. The indicia 20 can be in the form of increment or scale markers 22 that may be preprinted on the dial plaque 18 to give values to the measured quantities in miles per hour, kilometers per hour, degrees, rpm, psi, minutes, etc. The outline of the dial plaque 18 may also be printed, embossed or otherwise created on the fascia 12 of the cluster 10 for function and aesthetic appeal.

Various non-analog displays or "telltales" collectively referred to at reference numeral 24 can include a low fuel display 26, turn signal arrows 30, 32, engine temperature 34, high beam light 36 and check engine 38. Other telltales may also be provided. It will be noted that the telltales 24 can be physically arranged so as to correspond generally at an elevation on the dial plaque 18 consistent with the indicia 20.

Figure 2:
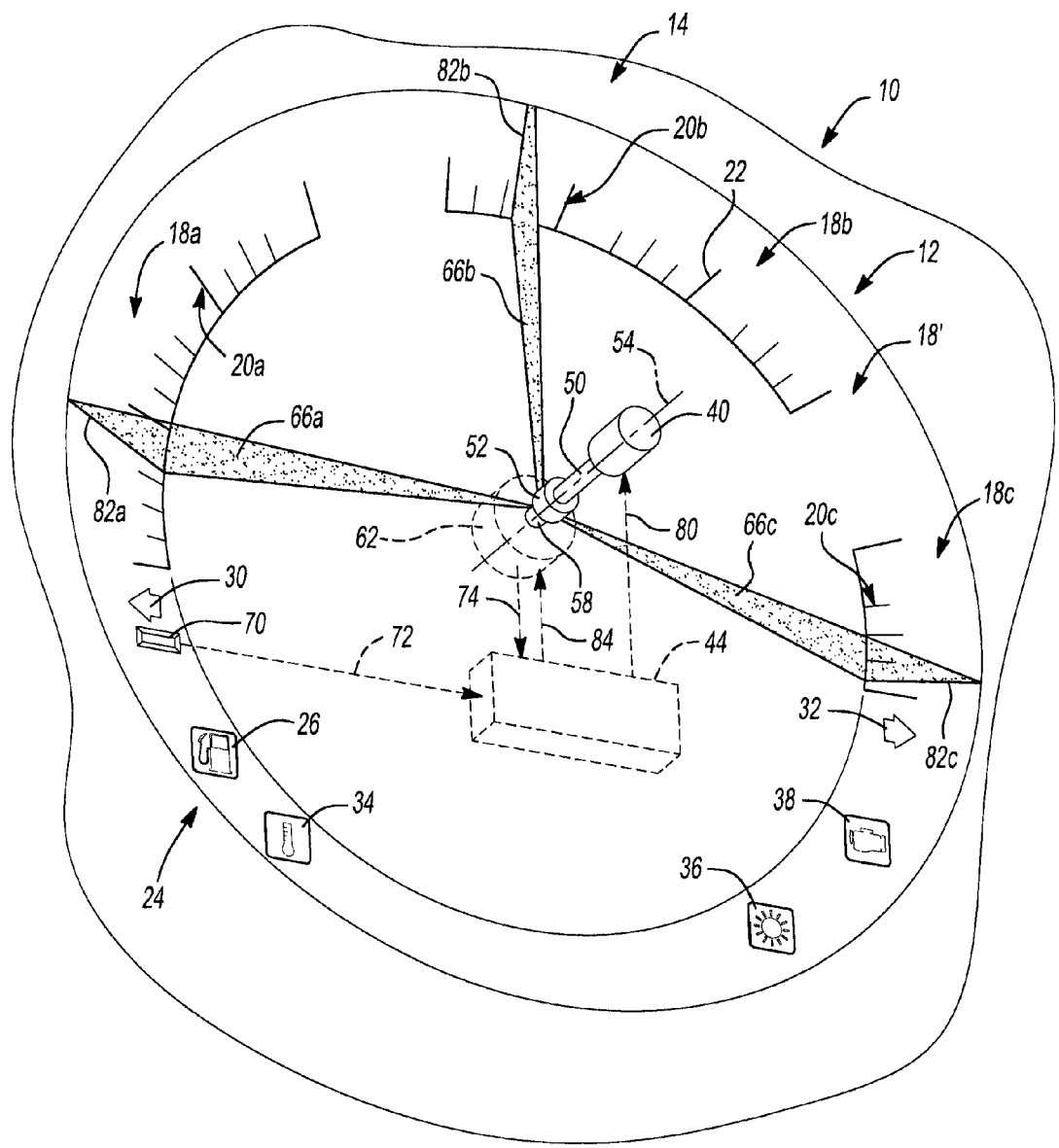
FIG. 2 is a front perspective view of an instrument cluster constructed in accordance to additional features of the present teachings.

In another example shown in FIG. 2, a dial plaque 18' can be divided into multiple display regions 18a, 18b and 18c for example. Each display region 18a, 18b and 18c can be configured to correspond to a different measured quantity (vehicle speed, engine speed and others identified above). In such a configuration, each display region 18a, 18b and 18c can have its own unique set of indicia 20a, 20b and 20c.

According to one example, illumination markers are created in the display field 14 around a 360° sweep of the dial plaque 18 to identify a desired, measured quantity value on the dial plaque 18, such as at the indicia 20 as well as concurrently illuminating any combination of the telltales 24 identified above. These illumination markers are created by a light source 40, which operates in an on/off mode under the control of a high-speed controller 44. In one example, the light source 40 can comprise a diode laser. The controller 44 can be configured to receive vehicle inputs 46 (FIG. 3) from various vehicle components 48. The controller 44 can include signal interpretation algorithms that interpret the vehicle inputs 46 and generate a set of light source signals as will be described. In one example, multiple transducers can be provided that are capable of sending electrical signals representing instantaneous values of the various measure quantities. The conversion of the electrical signals from analog to digital form may be carried out either within the controller 44 or externally thereof by a suitable A/D converter according to the preferences of the system.

The light source 40 according to a first example is configured to output an incident beam of light 50 in a direction toward an optical device 52 that is mounted for rotation about an axis 54. The optical device 52 can be a simple curved surface mirror (like in this example embodiment) or other more complex optical components or systems that are capable to redirect and spread or focus the incident light. The optical device 52 can have a reflective surface 56 (FIG. 3). The optical device 52 can be rotated by way of a shaft 58 that extends from a motor 62 at a high and continuous rate of speed so that the light reflected off the optical device 52 (hereinafter referred to as a secondary beam 66) sweeps angularly across the display field 14 from left to right in a clockwise fashion as explained in greater detail below. In the exemplary configuration of FIG. 1, the optical device 52 is located generally within a boundary of the dial plaque 18 and is operable to reflect light 360° around the dial plaque 18 to illuminate in any combination the indicia 20 and the telltales 24.

The secondary beam 66 that is reflected off of the optical device 52 can also be reflected toward a photo-detector sensor 70, the output of which is connected as an input 72 to the controller 44 for calibrating or "zeroing" purposes explained in detail below. In one example, a signal, hereinafter angular position signal 74 can be sent from the motor 62 to the controller 44 indicative of an angular position of the shaft 58 (and therefore the angular position of the optical device 52). In one example, the motor 62 can be a brushless DC motor.

With continued reference to FIG. 1 and additional reference to FIG. 3, the relationship of the light source 40, the optical device 52 and the motor 62 will be described in greater detail. In one example, the light source 40 can emit the incident beam 50 in a direction along the mirror axis 54. With such a configuration, the optical device 52 is operable to reflect the incident light 50 as the secondary beam 66 around the dial plaque 18 in 360° of motion.

In operation, the light source 40 can be turned on to produce a calibration pulse, which is directed toward the photo-detector 70. This resets the data in the controller 44 to the zero-sweep position, such that the pulses provided by the motor 62 can be representative of 0.1° of angular movement of the secondary beam 66 in the clockwise direction starting from the leftmost position of the display field 14 to be activated. In one example, this could equate to 3600 pulses per rotation of the optical device 52 or 1200 pulses for each horizontal beam sweep. Assuming 80% of the pulses are usable, 960 pulses are available to scale the display field 14 and 320 pulses are available for other areas of the dial plaque 18, such as the telltales 24. In theory, 960 pulses across a speedometer range of 150 miles per hour allows 0.156 miles per hour resolution between consecutive pulses. Assuming, by way of example, that the display field 14 represents vehicle speed and a value of 50 miles per hour near the one-third of the display field 14 is to be indicated, the vehicle inputs 46 are converted to a pulse count representing approximately one-third of the total pulse count required to displace the secondary beam 66 the full width of the display field 14. When the angular position determined from the angular position signal 74 satisfies a predetermined value, the controller 44 outputs a signal, hereinafter light signal 80 that turns the light source 40 on and a stripe-like marker of light 82 (FIG. 1) is caused to appear on the dial plaque 18 of the display field 14. The light signal 80 can include light duration and starting point with regard to the angular position signal 74 of the motor shaft 58. The controller 44 can also output a signal, hereinafter a shaft angular position control signal 84 to the motor 62. The controller 44 can also have a light source driving function that compares the light signal 80 and the angular position signal 74, determined by signal interpretation algorithms in the controller 44 and switch the light source 40 on/off per the comparison result.

Returning now to the example shown in FIG. 2, the controller 44 can output a signal (such as light signal 80 described above) such that the light source 40 comes on at strategic times to create secondary beams 66a, 66b and 66c for illumination markers 82a, 82b and 82c at each display region 18a, 18b and 18c, respectively.

In one example, when the optical device 52 rotates sufficiently to direct the secondary beam 66 (66a, 66b, 66c, FIG. 2) onto the indicia 20 (20a, 20b, 20c; FIG. 2) of the dial plaque 18 (18; FIG. 2), data from the vehicle inputs 46 can be converted to pulse counts to cause the light source 40 to come on at strategic times representing appropriate locations for illumination within the display field 14 to show the measured quantities (such as illuminate at an appropriate location on the indicia 20 (20a, 20b, 20c; FIG. 2) and/or illuminate any of the telltales 24). In one example, the display field 14 is scanned repeatedly at a rate of approximately fifty times per second. In this way, each illumination marker, such as at 82 (82*a*, 82*b*, 82*c*; FIG. 2) is "refreshed" about fifty times per second and the characteristics of human sight are such that flicker will not be detected. In one example, the mirror can be rotated at a constant speed such as, but not limited to 3600 RPM, 60 Hz. The human eye will tend to blend the optical stimuli to create the appearance of continuous illumination markers in the display field 14. In one example, the telltales 24 may be physically defined by embossed outlines and more reflective or diffusive surface patterns to cause illumination blending. The light source 40 can be turned on continuously during the entire sweep across the telltales 32, 38, 36, 34, 26, and 30 in sequence, whichever needs to be lit per the vehicle inputs 46, so as to "paint" the entire surface of the telltales.

With additional reference now to FIG. 5, reflection of light on the optical device 52 according to the first example will be described. As shown, the incident beam 50 defines a width D and reflects off of the reflective surface 56 as the secondary beam 66. In one example, the reflective surface 56 can be a portion of a cylinder. For different configurations, various mirrors can be provided having dissimilar shapes.

For bottom incident:

$$R = \left\{ \frac{D}{2} \div \cos\left[180 - \left(90 - \frac{\alpha}{2}\right) - \frac{\theta}{2}\right] \right\} \div \sin\left(\frac{\alpha}{2}\right) \text{ or}$$

$$R = \left\{ \frac{D}{2} \div \cos\left[180 - \left(90 - \frac{\beta}{4}\right) - \frac{\theta}{2}\right] \right\} \div \sin\left(\frac{\beta}{4}\right)$$

For top incident $$R = \left\{ \frac{D}{2} \div \cos\left[\left(90 - \frac{\alpha}{2}\right) - \frac{\theta}{2}\right] \right\} \div \sin\left(\frac{\alpha}{2}\right) \text{ or}$$

$$R = \left\{ \frac{D}{2} \div \cos\left[\left(90 - \frac{\beta}{2}\right) - \frac{\theta}{2}\right] \right\} \div \sin\left(\frac{\beta}{2}\right)$$

Where:
D: the incident beam width
α the active arc angle of the mirror reflect surface
β the desired spread angle of the secondary beam
θ the angle between the low edge of the secondary beam and the incident beam With reference now to FIGS. 4 and 6, a cluster 110 according to additional features of the present disclosure will be described. The cluster 110 can be configured similar to the cluster 10 and have like components identified by reference numerals increased by 100. As a result, like components will not be repeatedly described with respect to the example of FIGS. 4 and 6. In the example provided in FIGS. 4 and 6, the light source 140 is arranged on an opposite side of the fascia 112 as the motor 162. The motor shaft 158 is tubular and defines a cannulation 159 along its axis. The light source 140 is configured to emit incident light 150 through the cannulation 159 of the shaft 158 and onto a reflective surface 156 defined on the optical device 152. The incident light 150 reflects off the reflective surface 156 of the optical device 152 as a secondary beam 166 and onto the display field 14. As with the example described above with respect to FIGS. 3 and 5, the light source 140 is operable to emit the incident light 150 generally along the axis of rotation 154 of the optical device 152. As with the first example, such a configuration can allow the optical device 152 to reflect a secondary beam 166 in a complete 360° sweep, thereby illuminating, in any combination, indicia and/or telltales provided on the display field 114.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A display for measured quantities comprising:
a dial plaque with at least one set of indicia spaced around the plaque to indicate the measured quantities;
an optical device mounted on a shaft within a perimeter of the dial plaque surrounded by the indicia, the optical device capable to redirect an incident light beam;
a motor for turning the shaft to rotate the optical device through three-hundred-sixty degrees about an axis of rotation centered on the shaft;
means for sensing the shaft rotating angular position;
a light source for projecting a light beam on the optical device along the axis of rotation such that a virtual pointer is generated, the optical device enabling the virtual pointer to be aimed at the at least one set of indicia for a three-hundred-sixty degree scan around the plaque as the optical device is rotated; and
a controller for receiving signals representing the measured quantities and for monitoring the angular position of the shaft provided from the sensing means, and to coordinate on/off of the light source based on the signals and the angular position.

2. The display of claim 1 wherein the dial plaque defines multiple sets of indicia at corresponding display regions, each set of indicia corresponding to a distinct measured quantity of the measured quantities.

3. The display of claim 2 wherein at least one of a unique illumination marker and an illuminated section of the indicia is identified concurrently on each set of indicia by the light beam that is redirected by the optical device.

4. The display of claim 1 wherein the optical device is a mirror having a curved reflector surface with a predetermined radius.

5. The display of claim 4 wherein the motor is located in a position intermediate of the mirror and the light source.

6. The display of claim 5 wherein the shaft defines a cannulation and wherein the light source projects the light beam through the cannulation.

7. The display of claim 6 wherein the cannulation is parallel to the axis of rotation.

8. The display of claim 6 wherein the mirror defines a body having an inner boundary, wherein the reflector surface is formed within the inner boundary of the body.

9. The display of claim 4 wherein the reflector surface is defined by a radius of a cylinder.

10. The display of claim 4 wherein the mirror is located in a position intermediate of the motor and the light source.

11. The display of claim 1 wherein the light source is a laser light source.

12. The display of claim 1, further comprising a light detector positioned to receive the light beam at a reference position, the light detector being connected to the controller for calibration purposes.

13. The display of claim 1 wherein the dial plaque further comprises at least one telltale and wherein the optical device redirects light from the light source at a location on at least one set of indicia and onto the at least one telltale to illuminate a location on the at least one set of indicia concurrently with the at least one telltale.

14. A display for measured quantities comprising:
- a dial plaque with a first and a second set of indicia spaced around the plaque to indicate a first and a second distinct measured quantity;
- an optical device mounted on a shaft within a perimeter of the dial plaque;
- a motor for turning the shaft to rotate the optical device through three-hundred-sixty degrees about an axis of rotation centered on the shaft;
- means for sensing the shaft rotating angular position;
- a light source for projecting a light beam on the optical device along the axis of rotation such that a virtual pointer is generated, the optical device enabling the virtual pointer to be aimed at the first and second sets of indicia for a three-hundred-sixty degree scan around the plaque as the optical device is rotated; and
- a controller for receiving signals representing the measured quantities and for monitoring the angular position of the shaft provided from the sensing means, and to coordinate on/off of the light source based on the signals and the angular position.

15. The display of claim 14 wherein the dial plaque further comprises at least one telltale and wherein the optical device redirects and spreads or focuses light from the light source to illuminate at least one telltale based on the signals representing the measured quantities.

16. The display of claim 14 wherein the optical device is a mirror having a curved reflector surface with a predetermined radius.

17. The display of claim 16 wherein the motor is located in a position intermediate of the optical device and the light source.

18. The display of claim 16 wherein the shaft defines a cannulation and wherein the light source projects the light beam through the cannulation.

19. The display of claim 18 wherein the mirror defines a body having an inner boundary wherein the reflector surface is formed within the inner boundary of the body.

20. The display of claim 16 wherein the mirror is located in a position intermediate of the motor and the light source.

* * * * *